United States Patent [19]

Allen

[11] Patent Number: 4,626,132
[45] Date of Patent: Dec. 2, 1986

[54] OIL CONTAINMENT BARGE ASSEMBLY

[76] Inventor: Sebree J. Allen, Rte. 2, Kevil, Ky. 42053

[21] Appl. No.: 709,385

[22] Filed: Mar. 7, 1985

[51] Int. Cl.$^4$ .............................................. E02B 15/04
[52] U.S. Cl. ....................................... 405/71; 405/63; 405/70
[58] Field of Search ........................ 405/63, 64, 65, 71, 405/72; 210/922

[56] References Cited

U.S. PATENT DOCUMENTS

| | | | |
|---|---|---|---|
| 3,592,005 | 7/1971 | Greenwood | 405/71 |
| 3,599,434 | 8/1971 | Missud | 405/195 X |
| 3,630,033 | 12/1971 | Tuttle | 405/71 |
| 3,925,991 | 12/1975 | Poche | 405/65 |
| 4,059,962 | 11/1977 | Milgram | 405/72 |

FOREIGN PATENT DOCUMENTS

| | | | |
|---|---|---|---|
| 54003 | 3/1923 | Sweden | 405/65 |
| 816440 | 7/1959 | United Kingdom | 405/63 |

*Primary Examiner*—Dennis L. Taylor
*Attorney, Agent, or Firm*—Harrington A. Lackey

[57] ABSTRACT

An apparatus for containing an oil spill floating on a body of water, including a plurality of barges attached end-to-end in an endless configuration, or circle, around the oil spill, and in which the open spaces between the adjacent end portions of the barges are sealed by oil-impervious curtains suspended from the adjacent barges and clamp means clamping the opposite end portions of the curtains flush against the corresponding inner sidewall surfaces of the adjacent barges.

8 Claims, 6 Drawing Figures

OIL CONTAINMENT BARGE ASSEMBLY

BACKGROUND OF THE INVENTION

This invention relates to an apparatus for containing oil floating on a body of water, and more particularly to an oil containment barge assembly.

The problem of oil spills and oil slicks on bodies of water, and particularly the oceans, has been a serious one in recent years, since such spills have produced substantial pollution of marine life, shores and beaches. Such oil spills are generally quite large, occurring from the leaking or wreck of an oil tanker, or from a blowout in an off-shore drilling well.

Several attempts have been made to develop oil containing rings or fences for surrounding the oil spill, such as those disclosed in the following U.S. Pat. Nos.:
3,630,003; Tuttle et al; Dec. 28, 1971
3,847,816; DiPerna; Nov. 12, 1974
3,925,991; Poche; Dec. 16, 1975
3,998,060; Preus; Dec. 21, 1976
4,006,082; Irons; Feb. 1, 1977
4,174,185; Toki; Nov. 13, 1979
4,211,659; Nyfeldt et al; July 8, 1980

All of the above patents disclose various types of bouyant fences adapted to surround and contain an oil spill or slick on a body of water.

The Tuttle et al U.S. Pat. No. 3,630,033 discloses an oil fence surrounding an oil slick and providing a pumping platform 66 for pumping oil from the contained body of oil into a storage area, such as a barge 64. FIG. 6 of the Tuttle et al patent discloses flexible connections between the pontoons 10, and FIG. 7 discloses the pontoons connected together end-to-end in a curved configuration. Moreover, the U.S. Tuttle et al patent discloses weighted curtains 40 fixed to the sides of the pontoons by mounting plates 46 and overlapping each other to prevent oil from seeping outside of the fence perimeter through the spaces between the pontoons.

The Poche U.S. Pat. No. 3,925,991 also discloses an oil containment fence constructed of inter-connected pontoons, the spaces between which are covered by curtain-type seal assemblies 31 (FIG. 7).

The Preus U.S. Pat. No. 3,998,060 also discloses a plurality of weighted curtains or skirts 26 supported end-to-end to form an oil containing barrier.

However, none of the above patents disclose the utilization of a plurality of ocean-going barges connected in a circular or endless configuration surrounding the oil slick to be contained and also a plurality of flexible oil-impervious curtains which may be easily and quickly installed and disassembled.

SUMMARY OF THE INVENTION

This invention relates to an oil containment assembly of oceangoing barges adapted to be secured in an endless configuration, end-to-end, for containment of an oil spill in which unique curtain and clamping assemblies are provided for sealing the spaces between the barges so that the oil spill is completely contained.

One object of this invention is to provide an oil containment barge assembly secured in an endless configuration around the oil slick, and substantially rectangular flexible, oil-impervious curtains, such as tarpaulins, secured to the adjacent ends of the respective barges to span the open spaces between the adjacent barges, and means for detachably clamping the opposite end edges of the curtains against the inner sidewall surfaces of the barges.

Each flexible curtain is preferably made of tarpaulin and secured along its top edge to an elongated rigid spar, the ends of which are suspended to the opposite end portions of the barges. The curtain is weighted, preferably by an elongated iron or steel rod extending the full length of the curtain and secured to the bottom edge of the curtain.

The clamp means for clamping the opposite end edge portions of the curtains to the inner sidewall surfaces of the adjacent barges may be in the form of large bar magnets sewn or otherwise secured to the outer surfaces of the opposite end portions of the curtain so that the magnets adhere to the steel inner sidewall surfaces of the respective adjacent barges.

An alternate clamp means includes a pair of clamp heads pivotally secured to corresponding outboard arm members, which in turn, are pivotally mounted upon the decks or upper portions of the adjacent barges so that the clamp heads are cantilevered downward, and biased against the opposite end portions of the curtains to hold the opposite end portions of the curtains flush against the inner sidewall surfaces of adjacent barges.

Either type of clamp means may be easily and quickly operated to secure the opposite edge portions of the curtain substantially flush against the inner sidewall surfaces of adjacent barges to prevent, or essentially prevent, leakage of the oil through the spaces between the barges.

It is preferred that the top spar and the bottom weighted rod be substantially rigid to fully stretch the respective curtain into a vertical position, since the major portion of the curtain is not directly supported by the walls of the barges. The curtains are flexible to permit them to yield to wave motion of the surrounding water.

After the barge assembly is no longer needed for containment of the oil, either clamp assembly may easily be detached or unclamped and the mounting spars easily removed to permit recovery of the curtains. Then one pair of barges may be disconnected to permit towing the entire assembly in tandem back to port.

BRIEF DESCRIPTION OF THE DRAWINGS

FIG. 4 is an enlarged fragmentary plan section taken along the line 4—4 of FIG. 2;

DESCRIPTION OF THE PREFERRED EMBODIMENTS

Figure 1:
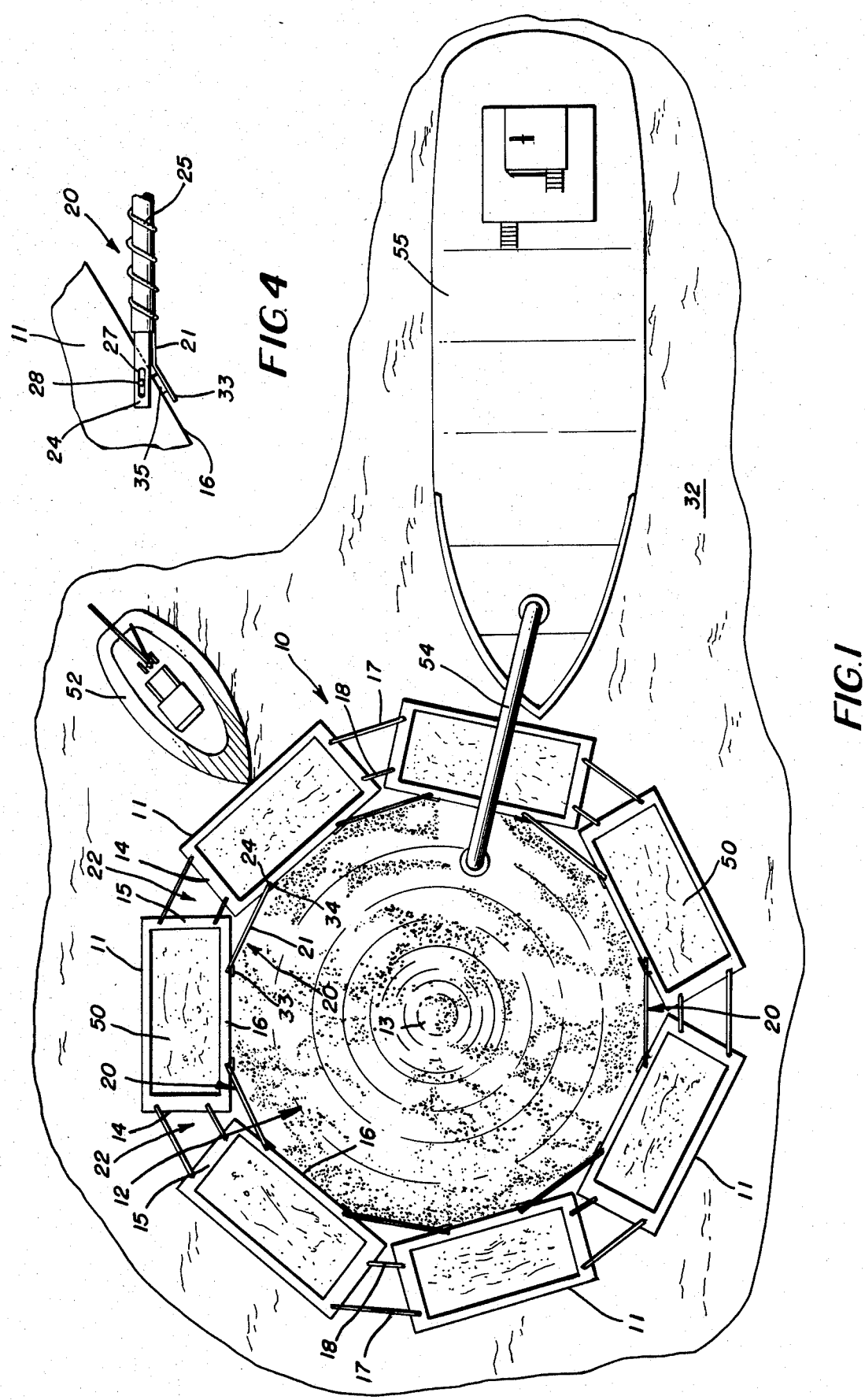
FIG. 1 is a top plan view of a barge assembly, made in accordance with this invention, in operative position surrounding an oil slick, a tow boat for maneuvering the barge assembly, and an oil tanker for pumping the floating oil from the spill into the tanker.

Referring now to the drawings in more detail, FIG. 1 discloses an oil containment barge assembly 10, made in accordance with this invention, in which a plurality of elongated, ocean-going barges 11 are arranged in an endless, or circular, configuration surrounding an oil spill 12, specifically, an oil spill created by the blow-out of an offshore drilling well 13. Each of the barges 11 has opposite end portions 14 and 15 and an inner sidewall surface 16.

The barges 11 are connected end-to-end by the connector cables 17 and 18, not only to hold adjacent barges together, but also preferably to secure the adjacent barges in the angular positions disclosed in FIG. 1 to form a circle, or other endless configuration, of barges 11. The towing cables 17 and 18 may be secured in any desired manner to the respective barges 11, not shown.

Mounted between each pair of adjacent barges 11, is a curtain assembly 20.

Figure 2:
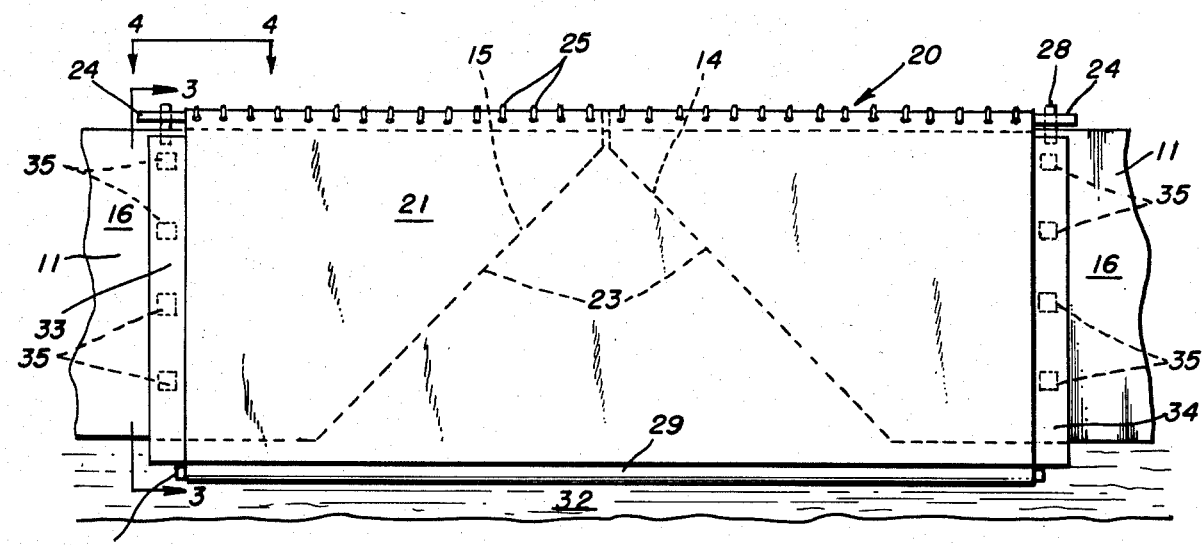
FIG. 2 is an enlarged fragmentary inner side elevation of a curtain mounted upon the adjacent end portions of a pair of barges in the assembly.
Figure 3:
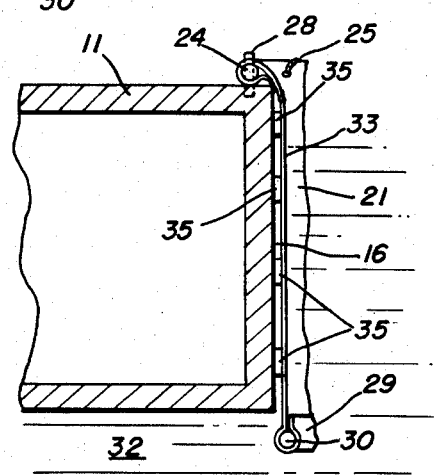
FIG. 3 is a fragmentary section taken along the line 3—3 of FIG. 2.

As best disclosed in FIG. 2, each curtain assembly 20 includes a single curtain 21 comprising a substantially rectangular sheet of oil-impervious flexible material. A preferred form of material is tarpaulin. The length of the curtain 21 is great enough to span the open space 22 between adjacent end portions of a pair of adjacent barges. The height of each curtain 21 is great enough that, when mounted between the adjacent barges 11, the curtain 21 will form a barrier against the flow of oil through space 22 between adjacent barges 11.

In FIG. 2, it will be noted that the normal configuration of each opposite end portion 14 and 15 of a barge 11 is an outward inclined rake portion 23. Thus, the space 22 between the rake portions 23 of adjacent barges must be spanned by the overall length of the curtain 21.

The top edge portion of the curtain 21 is wrapped or otherwise secured about an elongated top rigid spar 24 having a length commensurate with the length of the curtain 21. The top edge portion of the curtain 21 may be secured to the spar 24 by the lashing 25 to permit some adjustment of the depth of the curtain 21.

In lieu of a rigid spar 24, a cable or boom line might be used if maintained taut between the adjacent barges 11.

The opposite ends of the spar 24 are supported upon the top portion of the respective barges 11 in such a manner that the curtain 21 will depend in a substantially vertical plane on the inside of the inner sidewall surfaces 16 to span the space 22 and function as a flexible barrier for the oil to prevent leakage through the space 22.

In one form of mounting means for the spar 24, the opposite ends of the spars are provided with vertical elongated slots 27. Extending through both slots 27 is a bolt or headed pin 28, which is threadedly secured into a corresponding threaded opening in the top surface of each dredge 11 adjacent the interior sidewall surface 16, as best disclosed in FIG. 4. The elongated slots 27 permit the pin 28 to ride reciprocably within the corresponding slot 27 when there are slight variations in the angles of the adjacent barges 11, so that the curtain assembly 20 has a certain amount of play relative to the adjacent barges 11. The pins 28 may also extend upward far enough to permit variations in elevation between the barges 11 due to wave motion.

Moreover, other types of mounting means may be employed to secure the opposite ends of the spar 24 to the top portion or deck of the corresponding adjacent barges 11. For example, the opposite ends of the bar 24 may be lashed or secured by flexible cable to appropriate connectors or snubbing posts fixed on the deck or top surface of the adjacent barges 11.

In a preferred form of the invention, the bottom edge portion of the curtain 21 is provided with an elongated sleeve 29 extending substantially the full length of the curtain 21. Received within the sleeve 29 is an elongated, rigid, weighted rod or bar, such as a steel rod 30, which functions as a ballast to hold down the curtain 21 when it is subjected to the turbulence of the body of water 32 upon which the barges 11 are supported.

The opposite end portions 33 and 34 of each curtain 21 may project outward beyond the top edge portion of the curtain secured by the lashing 25 so that the end portions 33 and 34 may be folded or bent away from the main plane of the curtain 21. Thus, the end or flap portions 33 and 34 will lie flush against the inner sidewall surfaces 16, which are in a different vertical plane from the plane of the major portion of the curtain 21, as best illustrated in FIG. 1.

As disclosed in FIGS. 1–4, the end portions 33 and 34 are provided with a plurality of vertically spaced bar magnets 35. These bar magnets 35 may be secured in any desired manner upon the respective end portions 33 and 34, such as by adhesives or stitching, or otherwise. As best disclosed in FIG. 4, when the bar magnets 35 magnetically adhere to the steel sidewall surface 16, the corresponding end portion 33 of the curtain 21 is held substantially in flush engagement with the sidewall surface 16. In this manner, the opposite end portions 33 and 34 of the curtain 21 are substantially sealed against the respective sidewall surfaces 16 of the adjacent barges 11 to provide a substantially complete barrier through the space 22 between the adjacent end portions of adjacent barges 11.

Figure 6:
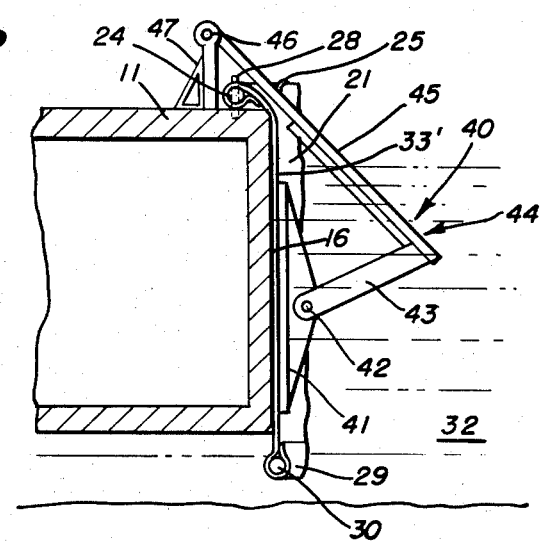
FIG. 6 is a fragmentary section taken along the line 6—6 of FIG. 5.
Figure 5:
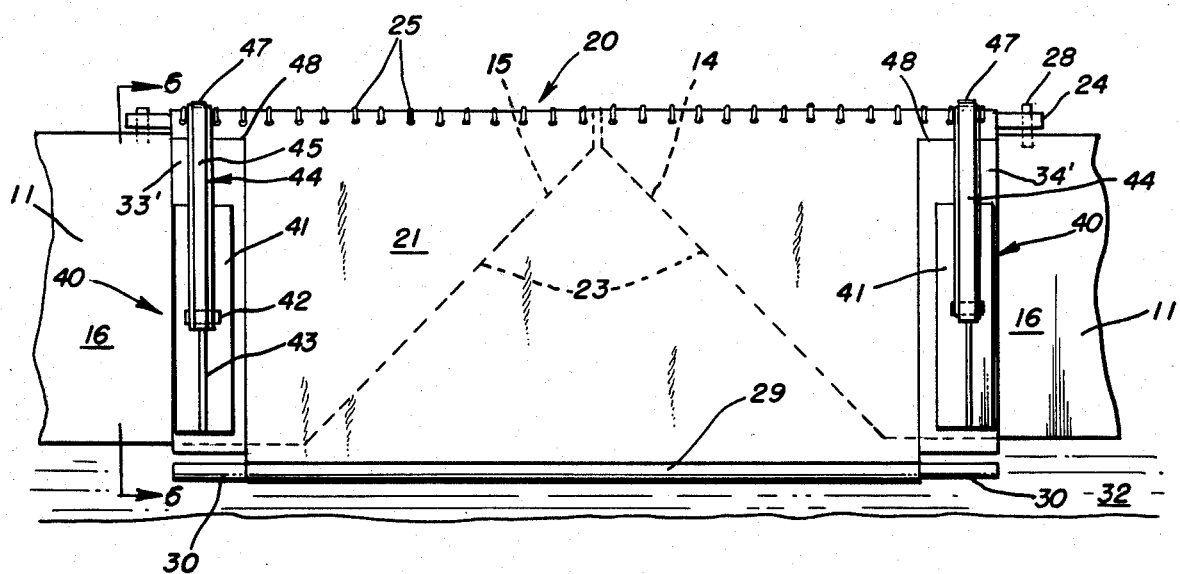
FIG. 5 is a fragmentary inner side elevation, similar to FIG. 2, but disclosing modified clamp members.

As disclosed in FIGS. 5 and 6, the bar magnets 35 are replaced by a pair of pivotal clamp members 40. Each clamp member 40 includes an elongated, vertically extending flat, clamp head 41. The clamp head 41 is pivotally joined by a pin 42 to the lower leg 43 of an outboard arm member 44. Fixed to the lower leg 43 is the upper leg 45 of the arm member 44 which declines away from the inner sidewall surface 16 of the barge 11. The upper end of the upper leg 45 is pivotally connected by pivot pin 46 to the journal bearing 47 fixed to the top portion of the barge 11 adjacent the inner sidewall surface 16.

As best disclosed in FIG. 5, the end portions 33' and 34' of the curtain 21 may be separated from the rest of the curtain 21 by the upper slit or cut line 48, so that the end portions 33' and 34' may lie flush against the inner sidewall surfaces 16, which are in vertical planes at angles to the plane of the main portion of the curtains 21, when the barges 11 are assembled in their circular containment configuration disclosed in FIG. 1.

The cantilever arrangement of the arm member 44 outboard of the inner sidewall surface 16 provides a constant turning moment of the clamp member 40 about the pivot pin 46, to force the clamp head 41 toward flush engagement with the inner sidewall surface 16 of the barge 11. Thus, each of the clamp heads 41 firmly holds the corresponding end portions 33' and 34' flush against the inner sidewall surfaces 16.

In the operation of the barge assembly 10, the barges 11 are initially collected and connected end-to-end in tandem in a substantially straight line. The curtain assemblies 20 and their mounting and clamping accessories are stowed in the barges 11. The barges 11 may be filled with any type of ballast material 50, (FIG. 1). The barges 11 are then towed by the tow boat 52 (FIG. 1) to the location of the oil spill 12. The tow boat 52 then tows the barges 11 into a circular configuration around the oil spill 12. By appropriate maneuvering of the barges 11 by use of the tow boat 52, the barges 11 are caused to occupy the desired configuration around the oil slick 12, such as the circular configuration disclosed in FIG. 1. Then the adjacent ends of the leading and trailing barges 11 are secured together by their appropriate connector cables 17 and 18 to form the endless circle of barges 11.

The crew then assembles the different curtain assemblies 20 and mounts the respective spars 24 upon the adjacent end portions 14 and 15 of the adjacent barges 11 to suspend the curtains 21 on the inside of the barges 11 to cover the spaces 22. The end portions or end flaps 33 and 34 of each curtain 21 is then secured substantially flush against the adjacent portion of the inner sidewall surfaces 16 by the magnets 35, as disclosed in FIGS. 1–4.

If the clamping members 45 of FIGS. 5 and 6, are utilized, then the clamp members 40 are swung about their pivot pins 46 and lowered until the corresponding clamp heads 41 engage the corresponding end portions or flaps 33' and 34' against the inner sidewall surfaces 16 of the adjacent barges 11.

After the curtain assemblies 20 are mounted and clamped in their operative positions as disclosed in FIGS. 1 and 2 or 5, the oil spill 12 is completely contained within the perimeter of the tandem barges 11. The oil floating on the surface of the water 32 within the perimeter of the tandem barges 11, may then be pumped through a pipe or conduit 54 into an oil tanker 55, by appropriate pumping mechanism, not disclosed, but as illustrated in FIG. 1.

After all of the oil within the spill 12 has been removed into the tanker 55, the connector cables 17 and 18 can be disconnected between any single pair of barges 11, and one of the end barges 11 is coupled to the tow boat 52. The tow boat 52 then tows the linear tandem barges 11 back to their home port. Before the tandem barges 11 are disconnected from each other, the curtain assemblies 20 are unclamped and dismounted and stowed in the respective barges 11 so that the barges 11 are then free to move through the water 32.

The lengths of the connector cables 17 and 18 are of course, adjustable in order to accommodate the barges 11 at different angular positions, including a straight towing position.

It will therefore be seen that an oil containment assembly 10 has been developed in which existing ocean-going barges 11 may be utilized, as well as a curtain assembly 20 which may be quickly and easily mounted and dismounted and clamped and unclamped from their operative positions, to seal the spaces 22 between the adjacent ends of adjacent barges 11.

What is claimed is:

1. An apparatus for containing oil floating on a body of water, comprising:
   (a) a plurality of elongated ocean-going barges, each barge having opposite end portions and inner sidewall surface, said barges adapted to be arranged end-to-end in an endless configuration surrounding an oil spill on a body of water, in which said inner sidewall surfaces of adjacent pairs of barges are disposed at an angle to each other, other than a straight angle,
   (b) means detachably connecting the adjacent end portions of said barges in said configuration,
   (c) a plurality of elongated oil-impervious curtains, each curtain having a top portion, a bottom portion, opposite end portions, and a major portion between said opposite end portions,
   (d) the dimensions of each curtain being great enough to span any free space between adjacent end portions of said barges in said configuration,
   (e) an elongated, straight rigid spar member for each curtain having opposite end portions and adapted to span the adjacent end portions of a pair of said adjacent barges in said configuration,
   (f) means securing said top portion of each curtain to a corresponding spar member,
   (g) means securing the opposite end portions of said spar member to corresponding end portions of adjacent pairs of said barges to permit each of said curtains to hand in a substantially vertical plane from said corresponding spar member as an oil barrier spanning the free space between adjacent end portions of said adjacent barges and inside the inner sidewall surfaces of said barges in said configuration,
   (h) weight means in the bottom portions of said curtains, and
   (i) clamp means detachably securing both opposite end portions of each of said curtains substantially flush against the corresponding inner sidewall surfaces of said adjacent barges in said configuration, whereby said major portions of each of said curtains is suspended in a different vertical plane from and spaced inward from, said inner sidewall surfaces.

2. The invention according to claim 1 in which said inner sidewall surfaces are magnetically attractive, and said clamp means comprises magnetic means secured to said opposite end portions of each of said curtains and magnetically secured to said corresponding inner sidewall surfaces.

3. The invention according to claim 1 in which said clamp means comprises a clamp head adapted to fit against the inner surfaces of the opposite end portions of said curtains, and mounting means on said adjacent barges connected to said corresponding clamp heads for biasing said clamp heads toward said inner sidewall surfaces to hold the corresponding opposite end portions of said curtains against said inner sidewall surfaces.

4. The invention according to claim 3 in which said mounting means comprises an arm member having upper and lower end portions, first means pivotally mounting said upper end portion to the upper portion of said barge, and second means pivotally connecting the lower end portion of said arm member to said clamp head, said arm member being disposed outboard of said corresponding inner sidewall surface.

5. The invention according to claim 4 in which said arm member comprises an upper leg and a lower leg, said upper leg declining away from said inner sidewall surface, and said lower leg being fixed to said upper leg and declining toward said inner sidewall surface.

6. The invention according to claim 1 in which said weight means comprises an elongated straight weighted rod member secured in the bottom edge portion of each of said curtains.

7. The invention according to claim 1 in which said means securing the top portion of each curtain to a corresponding spar member comprises lashing means.

8. The invention according to claim 1 in which said means securing the opposite end portions of said spar member to the corresponding end portions of adjacent pairs of barges, comprises means permitting limited movement between said opposite end portions of said spar member and said corresponding adjacent barges.

* * * * *